(12) United States Patent
Vasu et al.

(10) Patent No.: US 9,953,071 B2
(45) Date of Patent: Apr. 24, 2018

(54) DISTRIBUTED STORAGE OF DATA

(71) Applicant: Tata Consultancy Services Limited, Maharashtra (IN)

(72) Inventors: Arun Vasu, Kochi (IN); Abraham Varghese, Kochi (IN); Akhil Sreekumar, Kochi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 307 days.

(21) Appl. No.: 14/481,440

(22) Filed: Sep. 9, 2014

(65) Prior Publication Data

US 2015/0074115 A1    Mar. 12, 2015

(30) Foreign Application Priority Data

Sep. 10, 2013  (IN) .......................... 2918/MUM/2013

(51) Int. Cl.
  *G06F 17/30*    (2006.01)
(52) U.S. Cl.
  CPC .............................. *G06F 17/30575* (2013.01)
(58) Field of Classification Search
  CPC combination set(s) only.
  See application file for complete search history.

(56) References Cited

U.S. PATENT DOCUMENTS

| 8,209,664 | B2 * | 6/2012 | Yu | ........................... | H04L 12/44 |
| | | | | | 717/119 |
| 2010/0088296 | A1 * | 4/2010 | Periyagaram | ........... | G06F 3/061 |
| | | | | | 707/705 |
| 2010/0257198 | A1 | 10/2010 | Cohen et al. | | |
| 2012/0101991 | A1 * | 4/2012 | Srivas | ............... | G06F 17/30194 |
| | | | | | 707/623 |
| 2012/0182891 | A1 * | 7/2012 | Lee | ......................... | H04L 43/04 |
| | | | | | 370/252 |
| 2013/0173560 | A1 * | 7/2013 | McNeill | ............ | G06F 17/30303 |
| | | | | | 707/692 |

OTHER PUBLICATIONS

Title: Big Data in the Enterprise: Network Design Considerations, Author: Cisco Systems, Aug. 14, 2013.
Title: Designing algorithms for Map Reduce, Author: Ricky Flo, Aug. 29, 2010.

* cited by examiner

*Primary Examiner* — Etienne Leroux
(74) *Attorney, Agent, or Firm* — Seed IP Law Group LLP

(57) ABSTRACT

A file generation system for storage of structured data onto a distributed database includes an intermediate data generation module to generate a set of intermediate key-value pairs for each of one or more records in at least one subset of the structured data. A key-value pair includes a key and a value corresponding to the key, where the key is a unique identifier of the value. A file generation system further includes an intermediate data sorting module to sort the set of intermediate key-value pairs to generate a plurality of output files. Each of the plurality of output files includes at least one key-value pair. Further, the file generation system includes a file storing module to store the plurality of output files in the distributed database, where the plurality of output files are representative of the structured data.

15 Claims, 3 Drawing Sheets

DISTRIBUTED STORAGE OF DATA

TECHNICAL FIELD

The present subject matter relates, in general, to data storage and, in particular, to storage of data onto a distributed database.

BACKGROUND

In recent years, enterprises have seen substantial growth in data volume. Since enterprises continuously collect large datasets that record information, such as customer interactions, product sales, results from advertising campaigns on the Internet, many enterprises today are facing tremendous challenges due to the dramatic growth in data volume. Consequently, storage and analysis of large volumes of data have emerged as a challenge for many enterprises, both big and small, across all industries.

Recently, a data analytics framework, called Hadoop, has been widely adopted due to its capability of handling large sets of structured as well as unstructured data. The Hadoop is an open source programming framework for distributed computing with massive data sets using a cluster of multiple nodes. The Hadoop includes a Hadoop Distributed File System (HDFS) as a data storage layer and a Hadoop MapReduce framework as a data processing layer. The large data sets written to the HDFS are chunked into blocks; each block is replicated and saved on different nodes. The Hadoop MapReduce framework is used for processing the large data sets. In the MapReduce, a large data set is converted into output key-value pairs and the output key-value pairs are then stored into a distributed database, such as an HBase, as one or more output files.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
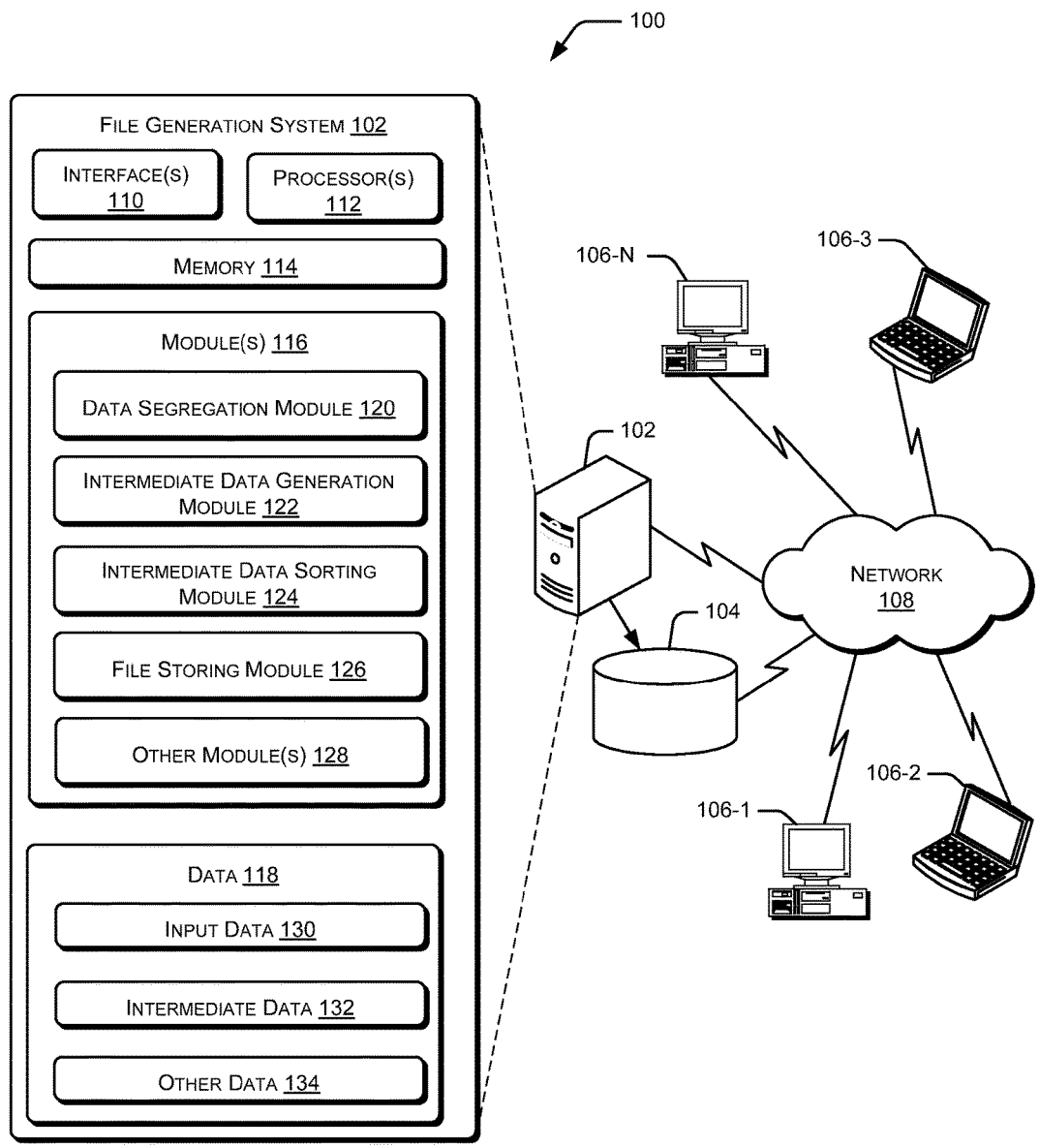
FIG. 1 illustrates a network environment implementing a file generation system, according to an embodiment of the present subject matter.

In recent years, MapReduce framework has emerged as a widely used platform for processing and analyzing data on terabyte and petabyte scales. The input to the MapReduce framework can be structured data or unstructured data. Examples of structured data include a comma-separated values (CSV) file or a delimited file, relational data, etc, and examples of unstructured data include metadata, health records, audio, video, analog data, files, etc.

Conventionally, in the MapReduce framework, operations on the structured data and the unstructured data occur in two phases: a map phase, and a reduce phase. The map phase and the reduce phase are carried out by multiple mappers and reducers, respectively, for processing the structured data and the unstructured data. Taking a scenario, when data (structured or unstructured) is provided as input to the MapReduce framework, in the map phase, the data is split into multiple blocks. The input to each mapper is one or more blocks of the data. The mappers process the blocks and produce, as output, a set of intermediate key-value pairs. A key-value pair includes a key and a value corresponding to the key. The mappers then transfer all intermediate key-value pairs to the reducers over a network for merging of all intermediate values associated with the same intermediate key. In the reduce phase, the intermediate key-value pairs are sorted and grouped by key by the reducers. Further, based on sorting, the reducers generate one or more output key-value pairs as output. The output key-values pairs are then stored into a distributed database, such as an HBase, as one or more output files.

Since very little computation is performed in the map phase, the mappers potentially generate more data for the reducers to process. Further, movement of large amount of data from the mappers to the reducers over the network results in high network traffic between the mappers and the reducers.

Further, every such data transfer consumes resources of the Hadoop cluster, such as resources of nodes of the Hadoop cluster requesting the data, resources of the nodes providing the data, and resources of the network, thereby leading to slower job completion. Also, in a situation where many mappers complete their tasks at the same time and initiate transfer of the intermediate key-value pairs to the reducers concurrently, there may be a significant burst of traffic in the network. Therefore, there may be a chance that the network may drop some of the intermediate key-value pairs during the transmission. As a result, any intermediate key-value pair dropped may have to be retransmitted which may further increase data transfer time as well as job completion time. Further, this may also lead to consumption of a considerable amount of network bandwidth. Therefore, the conventional MapReduce framework may be time consuming, resource intensive, and may include high communication costs.

The present subject matter describes systems and methods for storage of structured data onto a distributed database. The system described herein, referred to as file generation system, converts the structured data into a plurality of output files, having key value pairs representative of the structured data for storage into the distributed database.

Since the structured data is organized into logical records based on metadata and each record of the structured data can be identified by a unique key, each logical record is provided to one mapper and the unique key does not span across different mappers. Therefore, in situations where the structured data is to be stored onto the distributed database, transmission of intermediate key-value pairs from one mapper to multiple reducers over a network may not be necessary.

Hence, according to the present subject matter, generation of output files is carried out at one phase, i.e., at an enhanced map phase, unlike the conventional approach where, first, the intermediate key-value pairs are generated at one phase, i.e., the map phase, and transferred to another phase, i.e., the reduce phase, over a network, and then sorted to generate the output files. Since, generation of the intermediate key-value pairs and sorting of the intermediate key-value pairs to generate the plurality of output files occur without transfer of data over the network, the network overhead is eliminated and network resources are efficiently consumed. Also, the time delay for storage of the output files onto the distributed database is alleviated. Further, according to the present subject matter, the network is used for receiving the structured data from a user and not for transferring the intermediate key-value pairs. The user hereinafter refers to a software architect, an administrator, a programmer, and the like. As a result, network bandwidth consumption reduces. Thus, the file generation system makes storage of the structured data onto the distributed database efficient in terms of cost, resources, and time.

The manner in which the plurality of output files is generated and stored onto the distributed database is described henceforth. Further, for the sake of clarity, the manner in which the file generation system generates and stores the plurality of output files is described in four stages, hereinafter. The four stages being data segregation stage, intermediate data generation stage, intermediate data sorting stage, and file storing stage. These four stages may together be referred to as an enhanced map phase.

In an implementation of the present subject matter, in the data segregation stage, the file generation system receives structured data to be stored onto a distributed database, from a user. Examples of structured data include a comma-separated values (CSV) file or a delimited file, a relational data, etc. According to said implementation, the user may transmit the structured data to the file generation system over a network.

In one example, the structured data can be a table having a plurality of rows and columns. Each record in the table may include a primary key and at least one value associated with the primary key. A record may be understood as a row in the table. A primary key is a field or a combination of fields that uniquely identifies a one or more fields in a table. For instance, in a table representative of customers' information, such as customer IDs, names, phone numbers, E-mail addresses, etc., the customer IDs may be the primary key since every customer may have a unique customer ID.

The received structured data is then segregated into multiple independent subsets. In one implementation, the structured data may be segregated into equally sized subsets. In another implementation, the structured data may be segregated into differently sized subsets. Each subset may include one or more records. As mentioned earlier, a record may be understood as a row. Further, each row may include a primary key and at least one value associated with the primary key. In one example, if a table of six hundred rows and three columns is received from a user, then the table may be segregated into three subsets, such that a first subset includes first two hundred rows, a second subset includes next two hundred rows, and a third subset includes the last two hundred rows. The segregated structured data is further processed in the intermediate data generation stage.

According to an implementation of the present subject matter, in the intermediate data generation stage, the file generation system processes the multiple subsets to generate a set of intermediate key-value pairs for each of the one or more records in each of the multiple subsets of the structured data. As described earlier, a key-value pair includes a key and a value corresponding to the key. The key may be understood as a unique identifier of the value. In an implementation, to generate an intermediate key-value pair, a subset may be analyzed to identify which field of a record in the subset is a key and which field is the value.

In one implementation, in the intermediate data sorting stage, the sets of intermediate key-value pairs, which are generated for the multiple subsets, are sorted. As a result, a plurality of output files may be generated. Each of the plurality of output files includes at least one key-value pair. As described earlier, a key-value pair includes a key and a value corresponding to the key. In said implementation, the sets of intermediate key-value pairs are sorted based on the keys. In one implementation, the sets of intermediate key-value pairs may be sorted based on a conventional sorting technique. For instance, keys in the intermediate key-value pairs may be sorted lexicographically, in ascending or descending order. In lexicographical sorting, keys may be compared on a binary level, byte by byte, from left to right. According to an implementation, the intermediate key-value pairs are sorted and temporarily stored in a local memory of the file generation system.

Further, in the file storing stage, the file generation system invokes a bulk load Application Programming Interface (API) to store the plurality of output files into the distributed database. In one implementation, the distributed database may be an HBase instance in a Hadoop cluster. The HBase is an open source distributed database and the Hadoop cluster is a computational cluster designed for storing and analyzing the plurality of output files, the plurality of output files being representative of the structured data. Further, according to an implementation, the plurality of output files may be stored into the HBase as one or more HFiles. An HFile may include one or more key-value pairs, where keys of the one or more key-value pairs are same.

Although, it has been described that the enhanced map phase includes the data segregation stage for segregating the structured data that is received from the user, into multiple subsets, however, in another implementation, the data segregation stage may not include the enhanced map phase. In such a case, where the enhanced map phase does not include the data segregation stage, the segregated structured data, i.e., the multiple subsets may be directly received in the intermediate data generation stage for generation of the intermediate key-value pairs.

According to the present subject matter, since processing of the structured data to generate the plurality of output files is done entirely in the enhanced map phase, i.e., to generate the plurality of output files, generation of the intermediate key-value pairs and sorting of the intermediate key-value pairs is performed by one node without having to transfer the intermediate key-value pairs over a network, the use of described system and methods eliminate any network overhead and allow efficient usage of network resources. Also, the time delay for storage of output files onto the distributed database is alleviated. Further, since the network is used only for receiving the structured data from the user, as a result, network bandwidth consumption reduces.

The present subject matter thus provides a method implemented by the file generation system for storage of structured data onto the distributed database by efficient generation of the plurality of output files. Thus, the file generation system as described herein makes storage of the structured data onto the distributed database efficient in terms of cost, resources and time.

The following disclosure describes a system and a method for storage of structured data onto a distributed database. While aspects of the described system and method can be implemented in any number of different computing systems, environments, and/or configurations, embodiments for the information extraction system are described in the context of the following exemplary system(s) and method(s).

FIG. 1 illustrates a network environment 100 implementing a file generation system 102, according to an embodiment of the present subject matter. In said embodiment, the network environment 100 includes the file generation system 102 for storage of structured data onto a distributed database 104. The file generation system 102 may convert the structured data into a plurality of output files, having key value pairs representative of the structured data for storage into the distributed database 104.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones. The file generation system 102 may be implemented in a variety of computing systems, such as a laptop computer, a desktop computer, a notebook, a workstation, a mainframe computer, a server, and a network. The file generation system 102 may also be implemented in different nodes of a distributed file storage system, such as nodes of a Hadoop cluster and the like. In one implementation, the file generation system 102 may be included within an existing information technology infrastructure.

Further, it will be understood that the file generation system 102 may be communicatively connected to the distributed database 104. The file generation system 102 processes the structured data and stores the processed structured data in the distributed database 104. According to an implementation, the distributed database 104 may be an HBase instance in a Hadoop cluster. The HBase is an open source distributed database and the Hadoop cluster is a computational cluster designed for storing and analyzing the processed structured data.

Furthermore, the file generation system 102 may be connected to a plurality of user devices 106-1, 106-2, 106-3, ..., 106-N, collectively referred to as user devices 106 and individually referred to as a user device 106. The user device 106 may include, but is not limited to, a desktop computer, a portable computer, a mobile phone, a handheld device, and a workstation. The user devices 106 may be used by users, such as software architects, administrators, programmers, and the like.

As shown in FIG. 1, the user devices 106 are communicatively coupled to the file generation system 102 over a network 108 through one or more communication links for communication between users and the file generation system 102. Also, the user devices 106 are communicatively coupled to the distributed database 104 over the network 108. Further, the users can read from and write onto the distributed database 104 using the user devices 106.

In one implementation, the network 108 may be a wireless network, a wired network, or a combination thereof. The network 108 may also be an individual network or a collection of many such individual networks, interconnected with each other and functioning as a single large network, e.g., the Internet or an intranet. The network 108 may be implemented as one of the different types of networks, such as intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

Further, the network 108 may include a variety of network devices, including routers, bridges, servers, computing devices, storage devices, and the like.

The file generation system 102 may further include interface(s) 110. Further, the interface(s) 110 may include a variety of software and hardware interfaces, for example, interfaces for peripheral device(s), such as a product board, a mouse, an external memory, and a printer. Additionally, the interface(s) 110 may enable the file generation system 102 to communicate with other devices, such as web servers and external repositories. The interface(s) 110 may also facilitate multiple communications within a wide variety of networks and protocol types, including wired networks, for example, LAN, cable, etc., and wireless networks, such as WLAN, cellular, or satellite. For the purpose, the interface(s) 110 may include one or more ports.

In an implementation, the file generation system 102 may include processor(s) 112 coupled to a memory 114. The processor(s) 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 may be configured to fetch and execute computer-readable instructions stored in the memory 114.

The memory 114 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the file generation system 102 may include module(s) 116 and data 118. The module(s) 116 include, for example, a data segregation module 120, an intermediate data generation module 122, an intermediate data sorting module 124, a file storing module 126, and other module(s) 128. The other module(s) 128 may include programs or coded instructions that supplement applications or functions performed by the file generation system 102. The data 118 may include input data 130, intermediate data 132, and other data 134. The other data 134, amongst other things, may serve as a repository for storing data that is processed, received, or generated as a result of the execution of one or more modules in the module(s) 116.

According to an implementation, the data segregation module 120 of the file generation system 102 may obtain, from a user device 106, structured data to be stored in the distributed database 104. In said implementation, a user may provide the structured data, to be stored in the distributed database 104, through the user device 106. Structured data is typically an organized and tabular form of data, such as information stored in a relational database table. Examples of structured data may include a comma-separated values (CSV) file or a delimited file, a relational data, etc. According to said implementation, the data segregation module 120 may receive the structured data from the user over the network 108.

In one example, the structured data can be a table having a plurality of rows and columns. Each record in the table may include a primary key. A record may be understood as a row. A primary key is a field may or a combination of fields that uniquely identifies one or more fields in a table. Values of the primary key can be used to refer to entire fields in a table, because each field has a different value for the primary key. For instance, in a table representative of customers' information, such as customer IDs, names, phone numbers, E-mail addresses, etc, the customer IDs may be the primary keys since every customer may have a unique customer ID. Since names of the customers might not be reliably unique, and the phone numbers and E-mail addresses of the customers are also likely to change, these fields may not be suitable choices to be considered for primary keys. According to an implementation, the data segregation module 120 may store the received structured data within the input data 130 of the file generation system 102.

Furthermore, the data segregation module 120 segregates the structured data into at least one subset. A subset may include one or more records. As mentioned earlier, a record may be understood as a row. Further, each row may include a primary key and at least one value associated with the primary key. For example, if a table of six hundred rows and three columns is received from the user, then the data segregation module 120 may segregate the table into three independent subsets, wherein a first subset may include first two hundred rows, a second subset may include next two hundred rows, and a third subset may include the last two hundred rows.

Although, it has been described that the data segregation module 120 of the file generation system 102 obtains the structured data from the user through the user device 106 and segregates the same into at least one subset, however, in another implementation, the file generation system 102 may directly receive the segregated structured data from the user, through the user device 106.

Subsequently, the intermediate data generation module 122 receives the at least one subset as input and processes the at least one subset to generate a set of intermediate key-value pairs for each of the one or more records in the at least once subset of the structured data. A key-value pair includes a key and a value corresponding to the key. The key may be understood as a unique identifier of the value. To generate the intermediate key-value pairs, the intermediate data generation module 122 analyses the one or more records in at least one subset and identifies which fields of the one or more records in the at least one subset are the keys and which are the values. According to an implementation, the intermediate data generation module 122 may store the intermediate key-value pairs within the intermediate data 132 of the file generation system 102.

Thereafter, the intermediate data sorting module 124 sorts the sets of intermediate key-value pairs generated for each of the one or more records in the at least one subset. As a result, a plurality of output files may be generated. Each of the plurality of output files includes at least one key-value pair.

In one implementation, the intermediate data sorting module 124 sorts the set of intermediate key-value pairs based on the key. In said implementation, the intermediate data sorting module 124 may sort the sets of intermediate key-value pairs based on a conventional sorting technique. For instance, the keys of the intermediate key-value pairs may be sorted based on sorting the keys lexicographically, in ascending or descending order. In lexicographical sorting, keys may be compared on a binary level, byte by byte, from left to right. In an example, if the intermediate key-value pairs are (1, 24) (4, 25) (3, 26), such that 1, 4, and 3 are the keys and 24, 25, and 26 are the values, then the intermediate data sorting module 124 sorts the intermediate key-value pairs and generates (1, 24) (3, 26) (4, 25) as output. In one implementation, the intermediate data sorting module 124 sorts the intermediate key-value pairs and temporarily stores the generated plurality of output files in the memory 114 of the file generation system 102. The intermediate generation and sorting of key-value pairs have been explained later in detail with respect to FIG. 2.

Thereafter, the file storing module 126 invokes a bulk load application programming interface (API) to store the plurality of output files into the distributed database 104. Further, the file storing module 126 stores each of the plurality of output files as at least one HFile into an HBase which is an open source distributed database. An HFile may include one or more key-value pairs, where keys corresponding to the one or more key-value pairs are same.

According to the present subject matter, since processing of the structured data to generate the plurality of output files is done entirely in the enhanced map phase, i.e., generation of the intermediate key-value pairs and sorting of the intermediate key-value pairs to generate the plurality of output files occur at one node without transfer of data over the network 108, the use of described system and methods eliminate any network overheads and allow efficient usage of network resources. Also, the time delay for storage of output files onto the distributed database 104 is alleviated. Further, since the network 108 is used only for receiving the structured data from the user devices 106, as a result, network bandwidth consumption reduces.

The present subject matter thus provides a framework implemented by the file generation system 102 for storage of the structured data onto the distributed database 104 by efficient generation of the plurality of output files. Thus, the file generation system 102 as described herein makes storage of the structured data onto the distributed database 104 efficient in terms of cost, resources and time.

Figure 2:
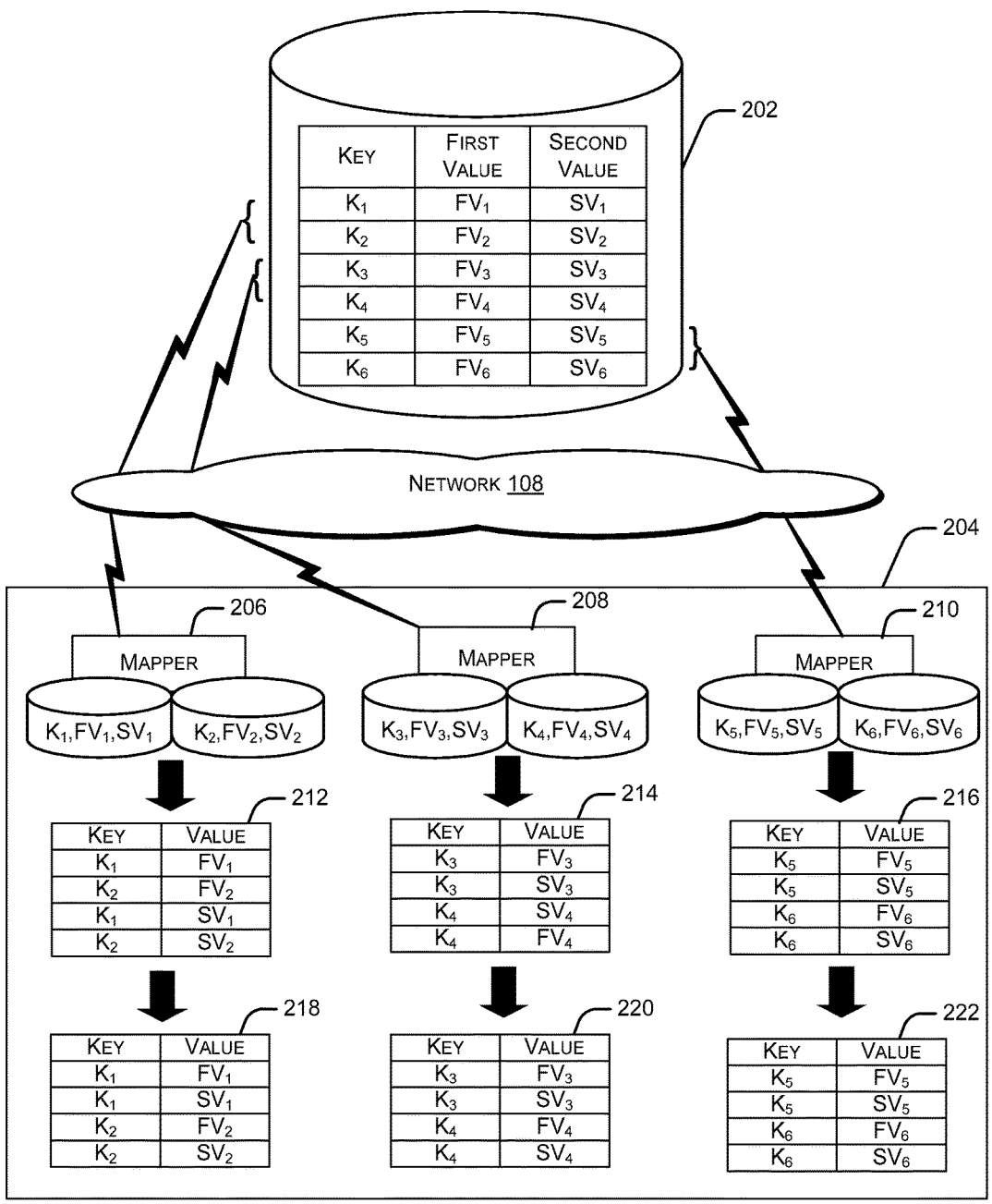
FIG. 2 illustrates exemplary output files generation process, using the file generation system, according to an embodiment of the present subject matter.

FIG. 2 illustrates exemplary output files generation process, using a file generation system 102, according to an embodiment of the present subject matter.

In reference to the FIG. 2, an exemplary data set 202 may be obtained as an input by the file generation system 102 (not shown in FIG. 2) over a network 108 for storage of structured data onto a distributed database 104 (not shown in FIG. 2). As shown in FIG. 2, the data set 202 is a structured table of three columns and six rows. As can be seen in FIG. 2, first column contains keys $K_1$, $K_2$, $K_3$, $K_4$, $K_5$, and $K_6$. Further, second column contains first values $FV_1$, $FV_2$, $FV_3$, $FV_4$, $FV_5$, and $FV_6$ associated with the keys and, third column contains second values $SV_1$, $SV_2$, $SV_3$, $SV_4$, $SV_5$, and $SV_6$ associated with the keys.

According to the present subject matter, operations on the data set 202 occur in an enhanced map phase 204. As shown in FIG. 2, the enhanced map phase 204 is carried out by three mappers, that is, a mapper 206, a mapper 208, and a mapper 210. Although, three mappers 206, 208, and 210 have been shown in FIG. 2, there may be more than three mappers.

Further, the data set 202 may be segregated into three subsets of equal size. Each subset may include one or more records. A record may be understood as a row. Further, each row may include a key and at least one value associated with the key. In the FIG. 2, the first subset includes first two rows of the data set 202, the second subset includes next two rows of the data set 202, and the third subset includes last two rows of the data set 202. Thus, the first subset contains $K_1$, $FV_1$, $SV_1$, and $K_2$, $FV_2$, $SV_2$. The second subset contains $K_3$, $FV_3$, $SV_3$, and $K_4$, $FV_4$, $SV_4$. The third subset contains $K_5$, $FV_5$, $SV_5$, and $K_6$, $FV_6$, $SV_6$.

As shown in FIG. 2, the mapper 206 receives the first subset as an input. The mapper 208 receives the second subset as an input and the mapper 210 receives the third subset as an input. Further, the mapper 206, mapper 208, and mapper 210 process the respective subsets and generate a set of intermediate key-value pairs for the records in each of the subsets. According to an implementation, an intermediate data generation module 122 of the file generation system 102 generates the sets of intermediate key-value pairs for the records in the subsets of the data set 202.

As can be seen in FIG. 2, the mapper 206 processes the first subset and generates a set of intermediate key-value pairs 212. The set of intermediate key-value pairs 212 includes four intermediate key-value pairs, $K_1$-$FV_1$, $K_2$-$FV_2$, $K_1$-$SV_1$, and $K_2$-$SV_2$. Similarly, the mapper 208 processes the second subset and generates a set of intermediate key-value pairs 214. The set of intermediate key-value pairs 214 includes four intermediate key-value pairs, $K_3$-$FV_3$, $K_3$-$SV_3$, $K_4$-$SV_4$, and $K_4$-$FV_4$. The mapper 210 processes the third subset and generates a set of intermediate key-value pairs 216. The set of intermediate key-value pairs 216 includes four intermediate key-value pairs, $K_5$-$FV_5$, $K_5$-$SV_5$, $K_6$-$FV_6$, and $K_6$-$SV_6$.

Subsequent to generation of the sets of intermediate key-value pairs 212, 214, and 216, the mappers 206, 208, and 210 sort the respective sets of intermediate key-value pairs to generate output files. According to an implementation of the present subject matter, an intermediate data sorting module 124 of the file generation system 102 sorts the set of intermediate key-value pairs based on the keys to generate a plurality of output files.

The mapper 206 sorts the set of intermediate key-value pairs 212 to generate an output file 218. The mapper 208 sorts the set of intermediate key-value pairs 214 to generate an output file 220, and the mapper 210 sorts the set of intermediate key-value pairs 216 to generate an output file 222. As can be seen in FIG. 2, after sorting of the sets of the intermediate key-value pairs 212, 214, and 216, sequence of occurrence of the intermediate key-value pairs in the output files 218, 220, and 222 is different. For example, in the set of the intermediate key-value pairs 212, the intermediate key-value pair $K_2$-$FV_2$ occurs before the intermediate key-value pair $K_1$-$SV_1$. However, as a result of sorting, the key-value pair $K_2$-$FV_2$ occurs after the key-value pair $K_1$-$SV_1$ in the output file 218. Each of the output files 218, 220, and 222 are then stored as at least one HFile into the HBase, where each HFile has one key.

Figure 3:
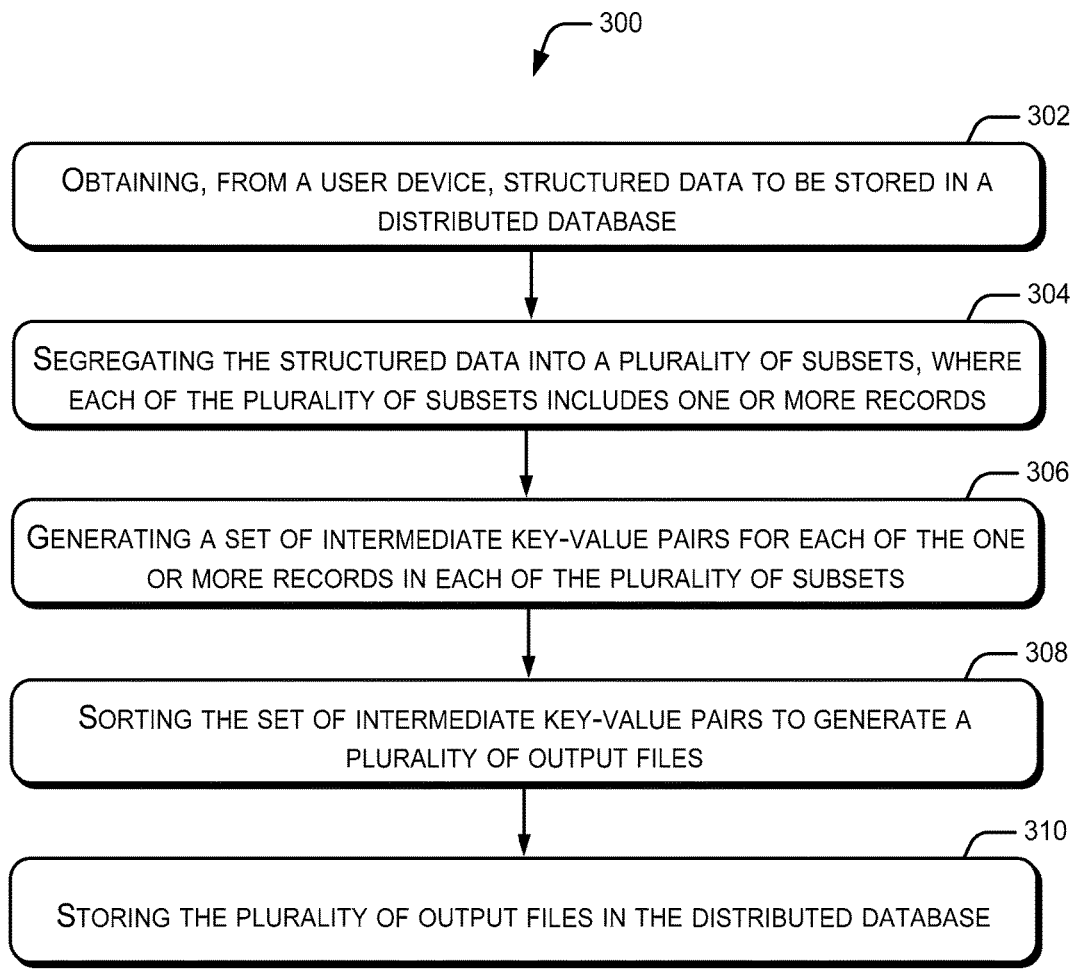
FIG. 3 illustrates a method for storage of structured data onto a distributed database, according to an embodiment of the present subject matter.

FIG. 3 illustrates a method 300 for storage of structured data onto a distributed database 104, according to an embodiment of the present subject matter.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in either a local or a remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, the method 300 may include obtaining, from a user device, structured data to be stored in a distributed database. In one implementation, the distributed database is an HBase instance in a Hadoop cluster. Examples of structured data may include a comma-separated values (CSV) file or a delimited file, a relational data, etc. According to one implementation, the data segregation module 120 of the file generation system 102 may obtain, from a user device 106, structured data to be stored onto a distributed database 104.

At block 304, the method 300 may include segregating the structured data into a plurality of subsets, where each of the plurality of subsets includes one or more records. A record may be understood as a row. In one implementation, the structured data is segregated into equally sized subsets. In another implementation, the structured data is segregated into differently sized subsets. In one implementation, the data segregation module 120 segregates the structured data into a plurality of subsets.

At block 306, the method 300 may include generating a set of intermediate key-value pairs for each of the one or more records in each of the plurality of subsets of the structured data. A key-value pair includes a key and a value corresponding to the key. The key may be understood as a unique identifier of the value. To generate the key-value pairs, the plurality of subsets may be analyzed to identify which fields of the one or more records in the plurality of subsets are the keys and which are the values. According to one implementation, the intermediate data generation module 122 generates a set of intermediate key-value pairs for each of the one or more records in each of the plurality of subsets of the structured data.

At block 308, the method 300 may include sorting the set of intermediate key-value pairs to generate a plurality of output files. Each of the plurality of output files includes at least one key-value pair. In one implementation, the sets of intermediate key-value pairs are sorted based on the keys. For instance, the keys of the intermediate key-value pairs may be sorted based on sorting the keys lexicographically, in ascending or descending order. In lexicographical sorting, keys may be compared on a binary level, byte by byte, from left to right. In one implementation, the intermediate data sorting module 124 sorts the sets of intermediate key-value pairs to generate a plurality of output files.

At block 310, the method 300 may include storing the plurality of output files in the distributed database. A bulk load application programming interface (API) is invoked to store the plurality of output files into the distributed database. Each of the plurality of output files is further stored as one or more HFiles into HBase. An HFile includes one or more key-value pairs, wherein keys corresponding to the one or more key-value pairs are same. According to an implementation, the file storing module 126 invokes a bulk load application programming interface (API) to store the plurality of output files into the distributed database 104.

Although embodiments for methods and systems for distributed storage of data have been described in a language specific to structural features and/or methods, it is to be understood that the invention is not necessarily limited to the specific features or methods described. Rather, the specific features and methods are disclosed as exemplary embodiments for distributed storage of data.

We claim:

1. A computer-implemented file generation system for storage of structured data onto a distributed database, the file generation system comprising:

a processor;

an intermediate data generation module coupled to the processor to generate a set of intermediate key-value pairs for each of one or more records in at least one subset of the structured data, wherein a key-value pair includes a key and a value corresponding to the key, and wherein the key is a unique identifier of the value;

an intermediate data sorting module coupled to the processor to sort the set of intermediate key-value pairs to generate a plurality of output files, wherein each of the plurality of output files includes at least one key-value pair, wherein generating the intermediate key-value pairs and sorting the intermediate key-value pairs is performed by one node without transferring the intermediate key-value pairs over a network;

a data segregation module coupled to the processor to obtain, from a user device, the structured data to be stored in a distributed database over the network, wherein the structured data is organized as logical records and is identified by a unique key, and wherein each logical record is assigned to a mapper; and a file storing module coupled to the processor to store the plurality of output files in the distributed database, wherein the plurality of output files is representative of the structured data.

2. The computer-implemented file generation system as claimed in claim 1, wherein the data segregation module segregates the structured data into the at least one subset, wherein the at least one subset includes one or more records.

3. The computer-implemented file generation system as claimed in claim 1, wherein the intermediate data sorting module sorts the set of intermediate key-value pairs based on the key.

4. The computer-implemented file generation system as claimed in claim 1, wherein the intermediate data sorting module sorts the set of intermediate key-value pairs lexicographically.

5. The computer-implemented file generation system as claimed in claim 1, wherein the file storing module further stores each of the plurality of output files as at least one HFile.

6. The computer-implemented file generation system as claimed in claim 5, wherein the at least one HFile includes one or more key-value pairs, wherein keys corresponding to the one or more key-value pairs are same.

7. The computer-implemented file generation system as claimed in claim 1, wherein the file storing module stores the plurality of output files as at least one HFile into an HBase.

8. The computer-implemented file generation system as claimed in claim 1, the file storing module further invokes a bulk load application programming interface (API) to store the plurality of output files in the distributed database.

9. The computer-implemented file generation system as claimed in claim 1, wherein the distributed database is an HBase instance in a Hadoop cluster.

10. A computer-implemented method for storage of structured data onto a distributed database, the method comprising:

obtaining, from a user device, a plurality of subsets of the structured data to be stored in the distributed database, wherein each of the plurality of subsets includes one or more records;

generating a set of intermediate key-value pairs for each of the one or more records in each of the plurality of subsets of the structured data, wherein a key-value pair includes a key and a value corresponding to the key, and wherein the key is a unique identifier of the value;

sorting the set of intermediate key-value pairs to generate a plurality of output files, wherein each of the plurality of output files includes at least one key-value pair, wherein generating the intermediate key-value pairs and sorting the intermediate key-value pairs is performed by one node without transferring the intermediate key-value pairs over a network;

obtaining, from a user device, the structured data to be stored in a distributed database over the network, wherein the structured data is organized as logical records and is identified by a unique key, and wherein each logical record is assigned to a mapper; and storing the plurality of output files in the distributed database, wherein the plurality of output files is representative of the structured data.

11. The computer-implemented method as claimed in claim 10, wherein the method further comprises segregating the structured data to generate the plurality of subsets.

12. The computer-implemented method as claimed in claim 10, wherein the distributed database is an HBase instance in a Hadoop cluster.

13. The computer-implemented method as claimed in claim 12, wherein each of the plurality of output files is further stored as at least one HFile into the Hadoop cluster, wherein the at least one HFile includes one or more key-value pairs, and wherein keys corresponding to the one or more key-value pairs are same.

14. The computer-implemented method as claimed in claim 10, wherein method further comprises storing the plurality of output files into an HBase.

15. A non-transitory computer-readable medium having embodied thereon a computer program for executing a method comprising:

obtaining, from a user device, a plurality of subsets of the structured data to be stored in the distributed database, wherein each of the plurality of subsets includes one or more records;

generating a set of intermediate key-value pairs for each of the one or more records in each of the plurality of subsets of the structured data, wherein a key-value pair includes a key and a value corresponding to the key, and wherein the key is a unique identifier of the value;

sorting the set of intermediate key-value pairs to generate a plurality of output files, wherein each of the plurality of output files includes at least one key-value pair, wherein generating the intermediate key-value pairs and sorting the intermediate key-value pairs is performed by one node without transferring the intermediate key-value pairs over a network;

obtaining, from a user device, the structured data to be stored in a distributed database over the network, wherein the structured data is organized as logical records and is identified by a unique key, and wherein each logical record is assigned to a mapper;

storing the plurality of output files in the distributed database, wherein the plurality of output files is representative of the structured data.

* * * * *